United States Patent Office 3,215,732
Patented Nov. 2, 1965

3,215,732
NAPHTHALENE DERIVATIVES
John S. Stephenson, Taplow, England, assignor to Imperial Chemical Industries Limited, London, England, a corporation of Great Britain
No Drawing. Filed Apr. 26, 1961, Ser. No. 105,571
Claims priority, application Great Britain, May 4, 1960, 15,716/60; Oct. 7, 1960, 34,438/60
9 Claims. (Cl. 260—501)

This invention relates to organic compounds and more particularly it relates to new naphthalene derivatives which possess valuable therapeutic properties.

According to the invention I provide naphthalene derivatives of the formula:

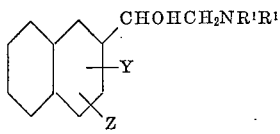

wherein $R^1$ stands for hydrogen or for a methyl radical, $R^2$ stands for a branched chain alkyl radical of not more than 4 carbon atoms and Y and Z stand for hydrogen, halogen, lower alkyl and lower alkoxy, and the non-toxic, pharmaceutically-acceptable salts thereof.

As suitable substituents in the naphthalene nucleus there may be mentioned for example chlorine or bromine atoms and methyl, ethyl, methoxy and ethoxy radicals.

The substituent $R^2$ may be for example an isopropyl, isobutyl, sec.-butyl or tert.-butyl radical.

Particularly useful compounds are [2-hydroxy-2-(2'-naphthyl)-ethyl]-isopropylamine, -tert.-butylamine, sec.-butylamine and isobutylamine and, of these, a particularly valuable compound is [2-hydroxy-2-(2'-naphthyl)-ethyl]-isopropylamine and the salts thereof.

The salts of the invention may be for example salts derived from inorganic acids for example hydrochlorides, hydrobromides, phosphates or sulphates or salts derived from organic acids for example oxalates, lactates, tartrates, acetates, salicylates and citrates.

According to a further feature of the invention I provide a process for the manufacture of the said naphthalene derivatives which comprises reduction of a naphthalene derivative of the formula:

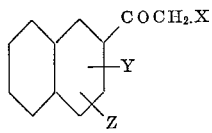

wherein Y and Z have the meanings indicated above, and X stands for a halogen atom, for example a chlorine or a bromine atom, followed by reaction of the reduction product so obtained with an amine of the formula $NHR^1R^2$ wherein $R^1$ and $R^2$ have the meaning stated above.

The said reduction process may be carried out by use of sodium borohydride as the reducing agent in the presence of a diluent or solvent for example methanol and at a temperature of about 0–25° C. The reduction process may also be carried out by the use of aluminum isopropoxide in the presence of a diluent or solvent for example isopropanol. The reduction product may be reacted with the said amine in the presence of a diluent or solvent for example ethanol and the process may be accelerated or completed by the application of heat.

It is to be understood that the said reduction product is believed to be one or other of the two naphthalene derivatives of the formula:

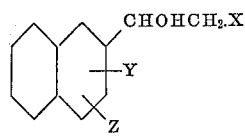

and

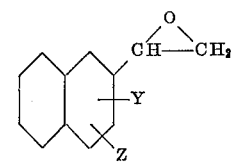

wherein $R^1$ stands for hydrogen or for a methyl radical, a mixture thereof, and either of these compounds or a mixture thereof can be used as starting material for the manufacture of the compounds of the present invention.

Thus according to a further feature of the invention I provide a process for the manufacture of the naphthalene derivatives which comprises interaction of a naphthalene derivative of the formula:

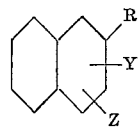

wherein Y and Z have the meanings stated above, and R stands for the group

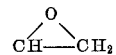

or for the group $CHOHCH_2X$ wherein X has the meaning stated above, and an amine of the formula $HNR^1R^2$ wherein $R^1$ and $R^2$ have the meanings stated above.

This process may be carried out in the presence of a diluent or solvent for example ethanol and may be accelerated or completed by the application of heat.

According to yet a further feature of the invention I provide a process for the manufacture of the naphthalene derivatives which comprises reduction of a naphthalene derivative of the formula:

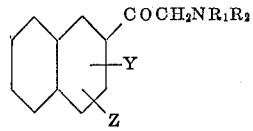

wherein Y, Z, $R^1$ and $R^2$ have the meanings stated above, or a salt thereof.

The reduction process may be carried out for example by use of sodium borohydride as reducing agent in the presence of a diluent or solvent for example aqueous methanol, or for example by use of a hydrogenation catalyst, for example palladium on carbon, and hydrogen in the presence of an inert diluent or solvent, for example, aqueous methanol.

According to a further feature of the invention I provide a process for the manufacture of the naphthalene derivatives in which $R^1$ stands for hydrogen and $R^2$ has the meaning stated above which comprises reaction of a naphthalene derivative of the formula:

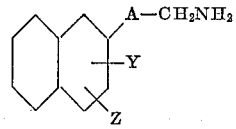

wherein Y and Z have the meanings stated above and A stands for the group CO or CHOH, with a carbonyl compound of the formula:

$$R^3R^4CO$$

wherein $R^3$ stands for hydrogen or for an alkyl radical and $R^4$ stands for an alkyl radical, provided that $R^3$ and $R^4$ together contain not more than 3 carbon atoms, under reducing conditions.

As suitable values of $R^3$ and $R^4$ there may be mentioned the methyl, ethyl or propyl radical. Suitable reducing conditions are those provided by the presence of a hydrogenation catalyst, for example platinum oxide, hydrogen and an excess of the carbonyl compound, for example, acetone.

According to a further feature of the invention I provide a process for the manufacture of the naphthalene derivatives wherein $R^1$ stands for hydrogen and $R^2$ has the meaning stated above which comprises hydrolysis of an acyl derivative of a naphthalene derivative of the formula:

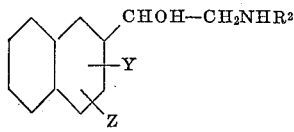

wherein Y, Z and $R^2$ have the meanings.

It is to be understood that the acyl derivative is such that the acyl radical may replace the hydrogen atom of the —OH group or the hydrogen atom of the —NH— group. It is also to be understood that the acyl radical may be mono- or di-functional and in the latter case the acyl radical forms part of a heterocyclic ring. Thus suitable starting materials are 2-acetoxy-2(2′-naphthyl)-ethylisopropylamine and 3-isopropyl-5-(2′-naphthyl)-2-oxazolidone. Hydrolysis may be carried out in an aqueous medium in the presence of acid or alkali.

The compounds with which this invention is concerned possess valuable therapeutic properties for example they antagonise certain effects of adrenaline on heart muscle and are therefore of value in the treatment or prophylaxis of coronary artery disease.

Thus according to yet a further feature of the invention I provide pharmaceutical compositions containing as active ingredient one or more naphthalene derivatives of the formula:

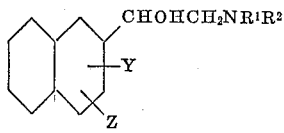

wherein Y, Z, $R^1$ and $R^2$ have the meanings stated above or a salt thereof in admixture with non-toxic, pharmaceutically-acceptable diluents or carriers therefor.

As suitable compositions there may be mentioned for example tablets, capsules, aqueous or oily solutions, aqueous or oily suspensions, emulsions, injectable aqueous or oily solutions or suspensions and dispersible powders.

The invention is illustrated but not limited by the following examples in which the parts are by weight:

*Example 1*

A solution of 10 parts of 2-naphthacyl bromide in 180 parts of methanol is stirred and 3 parts of sodium borohydride are added quickly, the temperature being kept below 25° C. The mixture is stirred at 20° C. for a further 30 minutes and is then poured on to ice and extracted with ether. The ethereal extract is washed with water, dried over sodium sulphate and evaporated to dryness thus providing a crude reduction product. This product is dissolved in 90 parts of anhydrous ethanol and is heated under reflux with 20 parts of isopropylamine for 16 hours. The solution is then evaporated to dryness under reduced pressure and the solid residue is suspended in 50 parts of water, acidified with hydrobromic acid and allowed to crystallise. The product is crystallised from aqueous acetone and there is thus obtained [2-hydroxy-2-(2′-naphthyl)-ethyl]isopropylamine hydrobromide, M.P. 177–179° C., otherwise known as 2-hydroxy-2-(2′-naphthyl)-N-isopropyl-ethylamine.

*Example 2*

A solution of 5 parts of the crude reduction product, obtained from 2-naphthacyl bromide by use of the process as described in Example 1, in 50 parts of absolute ethanol is heated under reflux with 10 parts of tert-butylamine for 16 hours. The solution is then evaporated to dryness under reduced pressure, the residue is basified with aqueous sodium hydroxide solution and the resulting mixture is then extracted with ether. The ethereal extract is dried and evaporated to dryness. The residue is crystallised from ether and there is thus obtained [2-hydroxy-2-(2′-naphthyl)-ethyl]-tert.-butylamine, M.P. 124° C. The oxalate, prepared by treatment of an ethereal solution of the base with ethereal oxalic acid, has M.P. 249° C. with decomposition.

*Example 3*

A solution of 7 parts of the crude reduction product, obtained from 2-naphthacyl bromide by use of the process as described in Example 1, in 100 parts of absolute ethanol is heated under reflux with 20 parts of sec.-butylamine for 16 hours. The solution is then evaporated to dryness under reduced pressure, the residue is basified with aqueous sodium hydroxide and the resulting mixture is extracted with benzene. The benzene extract is dried and is then treated with ethereal hydrogen chloride. There is thus obtained [2-hydroxy-2-(2′naphthyl)-ethyl]-sec.-butylamine hydrochloride which after crystallisation from acetone has M.P. 142–144° C.

*Example 4*

A solution of 7 parts of the crude reduction product, obtained from 2-naphthacyl bromide by use of the process as described in Example 1, in 100 parts of absolute ethanol is heated under reflux with 20 parts of isobutylamine for 16 hours. The solution is then evaporated to dryness, the residue is basified with aqueous sodium hydroxide and the resulting mixture is extracted with benzene. The benzene extract is dried and is then treated with ethereal hydrogen chloride. There is thus obtained [2-hydroxy-2-(2′-naphthyl)-ethyl]-iso-butylamine hydrochloride which after crystallisation from acetone has M.P. 196-198° C.

*Example 5*

A solution of 69 parts of 2-bromo-1-hydroxy-1-(2′-naphthyl)-ethane in 250 parts of ethanol is treated with 50 parts of isopropylamine and the resulting mixture is heated under reflux for 15 hours. The ethanol is then removed under reduced pressure, the residue is basified with aqueous sodium hydroxide and the resulting mixture is extracted with ether. The ethereal extract is dried and is then treated with ethereal hydrogen chloride. There is thus obtained [2-hydroxy-2-(2′-naphthyl)-ethyl]-isopropylamine hydrochloride which after crystallisation from a mixture of methanol and ether has M.P. 184° C.

The bromo-compound used as starting material may be prepared as follows:

A solution of 60 parts of 2-naphthacyl bromide and 60 parts of aluminum isopropoxide in 80 parts of isopropanol is heated under partial reflux for 6 hours, isopropanol being added as required to replace that which has distilled off. The mixture is then cooled and added to 200 parts of 5% hydrobromic acid aqueous solution, at 0° C. The reaction mixture is then filtered and the solid residue is washed with water and dried. It consists of 2-bromo-1-hydroxy-1-(2'-naphthyl)-ethane which after crystallisation from petroleum ether (B.P. 60–80° C.) has M.P. 66–68° C.

Example 6

2.2 parts of 2-bromo-1-(6'-ethyl-2'-naphthyl)-1-hydroxyethane, 4 parts of isopropylamine and 24 parts of ethanol are heated together under reflux for 18 hours. The solution is then evaporated to dryness, water is added and the mixture is made strongly alkaline with aqueous sodium hydroxide solution. The product is extracted with ether and the extracts are dried over magnesium sulphate and filtered. An ethereal solution of oxalic acid is added to the filtrate and the mixture is filtered. The solid residue consists of [2-(6'-ethyl-2'-naphthyl)-2-hydroxyethyl]isopropylamine oxalate, which is crystallised from methanol and then has M.P. 227–229° C.

The 2-bromo-1-(6'-ethyl-2'-naphthyl)-1-hydroxyethane used as starting material may be obtained as follows:

A solution of 1 part of sodium borohydride in 16 parts of methanol is added at 10–15° C. With stirring to a solution of 3.2 parts of 6-ethyl-2-naphthacyl bromide in 80 parts of methanol during 15 minutes. The mixture is stirred at 0° C. for a further 30 minutes and is then poured on to ice and filtered. The solid residue is washed with water and dried. It consists of 2-bromo-1-(6'-ethyl-2'-naphthyl)-1-hydroxyethane and can be crystallised from petroleum ether (B.P. 40–60° C.) and then has M.P. 74–75° C.

Example 7

When the 10 parts of 2-naphthacyl bromide, used in the process of Example 1 are replaced by 10 parts of 6-bromo-2-naphthacyl bromide there is thus obtained [2-hydroxy-2-(6'-bromo-2'-naphthyl)-ethyl-isopropylamine hydrobromide, M.P. 193–195° C.

Example 8

A solution of 1 parts of 2-bromo-1-(4'-bromo-1'-methoxy-2'-naphthyl)-1-hydroxyethane and 6 parts of isopropylamine, in 25 parts of ethanol is heated under reflux for 18 hours. The solution is then evaporated to dryness under reduced pressure. To the residue is added an excess of aqueous sodium hydrobromide solution and the mixture is extracted with ether. The ethereal solution is dried and treated with an excess of ethereal hydrogen chloride to give [2-(4'-bromo-1'-methoxy-2'-naphthyl)-2-hydroxyethyl]-isopropylamine hydrochloride, M.P. 222–224° C.

The 2-bromo-1-(4'-bromo-1' - methoxy-2'-naphthyl)-1-hydroxyethane used as starting material may be obtained as follows:

3.0 parts of 4-bromo-1-methoxy-2-naphthacyl bromide are dissolved in 80 parts of methanol. 1 part of sodium borohydride dissolved in 16 parts of methanol is added with stirring at 5–15° C. During 15 minutes. The mixture is then stirred for a further 15 minutes and is then poured on to ice and filtered. The solid residue consists of 2-bromo-1-(4'-bromo-1' - methoxy-2'-naphthyl) - 1-hydroxyethane which when crystallised from petroleum ether (B.P. 60–80° C.) M.P. 81–82° C.

Example 9

When the 1 part of 2-bromo-1-(4'-bromo-1'-methoxy-2'-naphthyl)-1-hydroxyethane used in Example 8, is replaced by 1 part of 1-(5'-bromo-6'-methoxy-2'-naphthyl)-1-hydroxy-2-bromoethane there is thus obtained [2-(5'-bromo-6'-methoxy-2'-naphthyl) - 2-hydroxyethyl]-isopropylamine, isolated as the base, M.P. 145° C.

The 2-bromo-1-(5'-bromo-6' - methoxy-2'-naphthyl)-1-hydroxyethane used as starting material may be obtained as follows:

2.9 parts of 5-bromo-6-methoxy-2-naphthacyl bromide is dissolved in 70 parts of methanol. A solution of 1 part of sodium borohydride in 12 parts of methanol at 15–20° C. is added with stirring during 15 minutes. The mixture is stirred at 15–20° C. for a further 15 minutes and is then poured onto ice and filtered. The solid residue is washed with water and dried and consists of 2-bromo-1-(5'-bromo - 6'-methoxy - naphthyl-2')-1 - hydroxyethane which when crystallised from ethanol or cyclohexane has M.P. 104–105° C.

Example 10

When the 1 part of 2-bromo-1-(4'-bromo-1'-methoxy-2'-naphthyl)-1-hydroxyethane used in Example 8 is replaced by 1 parts of 2-chloro-1-hydroxy-1-(6'-methoxy-2'-naphthyl)-ethane there is thus obtained [2-hydroxy-2-(6'-methoxy-2' - naphthyl)-ethyl]isopropylamine, isolated as the base, M.P. 130–131° C.

The 2-chloro-1-hydroxy-1 - (6'-methoxy-2'-naphthyl)-ethane used as starting material may be obtained as follows:

6.6 parts of 6-methoxy-2-naphthacyl chloride are dissolved in 120 parts of methanol and to the solution so obtained there is added a solution of 2.5 parts of sodium borohydride in 40 parts of methanol at 0° C. during 15 minutes. The mixture is stirred for a further 5 minutes at 0° C. and is then poured on to ice and filtered. The solid residue is washed with water and dried. It consists of 2-chloro-1-hydroxy-1-(6'-methoxy-2' - naphthyl)ethane which when crystallised from cyclohexane has M.P. 55–56° C.

Example 11

A solution of 1.7 parts of 2-naphthylethylene oxide and 2.5 parts of isopropylamine in 8 parts of ethanol is heated under reflux for 3 hours. The mixture is then evaporated, the residue is dissolved in ether and there is added thereto an ethereal solution of hydrogen chloride. The mixture is filtered and the solid residue is washed with ether, dried and crystallised from a mixture of methanol and ethyl acetate. The hydrochloride thus obtained is dissolved in water, the solution is made strongly alkaline with sodium hydroxide solution and the liberated base is separated and crystallised from ethyl acetate to give [2-hydroxy - 2-(2'-naphthyl)-ethyl] - isopropylamine, M.P. 108° C.

The 2-naphthylethylene oxide used as starting material may be obtained as follows:

A solution of 2.5 parts of 2-bromo-1-hydroxy-1(2'-naphthyl)-ethane in 4 parts of ethanol is added to a solution of 0.84 part of potassium hydroxide in 6 parts of ethanol. The mixture is kept at room temperature for 15 minutes and 50 parts of water are then added. The mixture is extracted with ether and the extracts are combined, washed with water, dried and evaporated. The solid residue consists of 2-naphthylethylene oxide, M.P. 54–55° C.

Example 12

A solution 1 part of 2-hydroxy-2-(2'-naphthyl)-ethylamine in 4 parts of acetone is shaken with a platinum oxide catalyst and hydrogen at 20° C. at atmospheric pressure for 5 hours. The mixture is then filtered and the filtrate is evaporated. The solid residue is crystallised from ethyl acetate to give [2-hydroxy-2-(2'-naphthyl)-ethyl]-isopropylamine, M.P. 108° C.

The 2-hydroxy-2-(2'-naphthyl)-ethylamine used as starting material may be obtained as follows:

A solution of 1.7 parts of N-[2-hydroxy-2-(2'-naphthyl)-ethyl]-phthalimide and 0.5 part of hydrazine hydrate in 8 parts of ethanol is heated under reflux for 3 hours.

The mixture is then cooled, made acid with 10 N-hydrochloric acid and filtered. The filtrate is evaporated and the residue is dissolved in water. The solution thus obtained is made strongly alkaline with sodium hydroxide solution and extracted with warm benzene. The benzene solution is dried over sodium sulphate and filtered whilst still warm. The filtrate is cooled and filtered. The solid residue consists of 2-hydroxy-2-(2'-naphthyl)-ethylamine, M.P. 118° C.

The phthalimide starting material used above may be obtained as follows:

A solution of 5 parts of 1-bromo-2-hydroxy-2-(2'-napthyl)-ethane and 4 parts of potassium phthalimide in 20 parts of dimethylformamide is heated at 150° C. for 3 hours. The solution is then added to water and the mixture is filtered. The solid residue is extracted with 60 parts of hot ethanol. The undissolved part consists of N - [2-hydroxy-2-(2'-naphthyl)-ethyl]-phthalimide, M.P. 186–188° C.

*Example 13*

4 parts of sodium borohydride are added during 45 minutes to a stirred solution of 4 parts of 2-(isopropylaminoacetyl)naphthalene oxalate in 200 parts of methanol and 250 parts of water at 25° C. After 15 minutes, the methanol is evaporated at about 30° C. under reduced pressure, and the solid which is thus precipitated is extracted with 250 parts of ether. The ether extract is washed with water, dried and evaporated. The residual solid is crystallised from ethyl acetate and there is thus obtained [2 - hydroxy-2-(2'-naphthyl)-ethyl]-isopropylamine, M.P. 108° C.

*Example 14*

A solution of 4 parts of 2-aminoacetylnaphthalene hydrobromide in 160 parts of ethanol and 160 parts of acetone, and 1 part of platinum oxide are shaken for 8 hours at 25° C. with hydrogen at atmospheric pressure. The mixture is filtered and the filtrate is evaporated to dryness. A solution of 10 parts of sodium hydroxide in 200 parts of water is added to the residual solid and the mixture is extracted with 200 parts of ether. The ether extract is washed with water, dried, and evaporated. The residual solid is crystallised from ethyl acetate and there is thus obtained [2-hydroxy-2-(2'-naphthyl)ethyl] isopropylamine, M.P. 108° C.

*Example 15*

1.5 parts of 3-isopropyl-5-(2'-naphthyl)-2-oxazolidone, 60 parts of concentrated hydrochloric acid (specific gravity 1.18) and 50 parts of water are heated together at 100° C. for 24 hours. The cooled mixture is extracted with 50 parts of ether. The aqueous acid solution is made alkaline by the addition of 25 parts of sodium hydroxide and then extracted with 100 parts of ether. The ether extract is washed with water, dried, and evaporated. The solid residue is crystallised from ethyl acetate and there is thus obtained [2-hydroxy-2(2'-naphthyl)-ethyl]isopropylamine, M.P. 108° C.

*Example 16*

A solution of 3 parts of 2-methylisopropylamino-acetylnaphthalene oxalate in a mixture of 40 parts of ethanol and 15 parts of water is shaken with 0.3 part of a 5% palladium on carbon catalyst and hydrogen at 20° C. at atmospheric pressure for 6 hours. The mixture is then filtered and evaporated and the residue is dissolved in water. The solution obtained is made strongly alkaline with sodium hydroxide solution and extracted with ether. The ethereal solution is dried and filtered and ethereal hydrogen chloride is added thereto. The mixture is filtered and the solid residue is washed with ether and dried. It consists of [2-hydroxy-2-(2'-naphthylethyl]-methylisopropylamine hydrochloride which after crystallisation from a mixture of methanol and ethyl acetate has M.P. 170–172° C.

The 2-methylisopropylaminoacetylnaphthalene oxalate used as starting material may be obtained as follows:

25 parts of 2-naphthacyl bromide are dissolved in 240 parts of ether and 14 parts of methylisopropylamine are added. The solution is kept at 20° C. for 2½ hours and then at 2° C. for 16 hours. It is then extracted with dilute aqueous hydrochloric acid. The extract is made strongly alkaline with aqueous sodium hydroxide solution and extracted with ether. The ethereal extract is dried and etheral oxalic acid solution is added. The mixture is filtered and the solid residue is washed with ether and dried. It consists of 2-methylisopropylaminoacetylnaphthalene oxalate and after crystallisation from methanol has M.P. 185–187° C.

*Example 17*

15 parts of [2-acetoxy-2-(2'-naphthyl)ethyl]-isopropylamine hydrobromide are stirred with 200 parts of 2 N-sodium hydroxide solution at 20° C. for 2 hours. The mixture is then filtered and the solid residue is washed with water and dried. It consists of [2-hydroxy-2-(2'-naphthyl)ethyl]-isopropylamine, M.P. 108° C.

The acetoxy compound used as starting material may be obtained as follows:

2.5 parts of 2-bromo-1-hydroxy-1-(2'-naphthyl)-ethane are heated at 90° C. with 15 parts of acetyl chloride for 1 hour. The mixture is then evaporated in vacuo and the residue which consists of 1-acetoxy-2-bromo-1-(2'-naphthyl)-ethane is refluxed for 3 hours with 17 parts of isopropylamine and 16 parts of ethanol. The solution is then evaporated to dryness in vacuo and the residue is stirred with ether. The mixture is filtered and the solid residue is washed with ether and dried. It consists of [2 - acetoxy-2-(2'-naphthyl)ethyl]-isopropylamine hydrobromide which when crystallised from a mixture of methanol and ethyl acetate has M.P. 176–178° C.

*Example 18*

A mixture of 50 parts of [2-hydroxy-2-(2'-naphthyl)-ethyl]-isopropylamine hydrochloride, 125 parts of maize starch, 270 parts of calcium phosphate and 1 part of magnesium stearate is compressed and the compressed material is then broken down into granules by passage through a 16-mesh screen. The granules so obtained are then compressed into tablets according to the known art. The tablets so obtained are suitable for oral use for therapeutic purposes. When the 50 parts of [2-hydroxy-2-(2'-naphthyl)-ethyl]-isopropylamine hydrochloride used as starting material in the above process are replaced by 50 parts of [2-hydroxy-2-(2'-naphthyl)-ethyl] - tert. - butylamine oxalate or by 50 parts of [2-hydroxy-2-(2'-naphthyl)-ethyl]-iso-butylamine hydrochloride or by 50 parts of [2-hydroxy-2-(2'-naphthyl)-ethyl]-sec. - butylamine hydrochloride, there are likewise obtained tablet compositions which are suitable for oral use for therapeutic purposes.

*Example 19*

The following are typical formulations to provide tablets according to standard pharmaceutical techniques:

(i)

| | Mg. |
|---|---|
| [2-hydroxy-2-(2'-naphthyl) - ethyl] - isopropylamine hydrochloride | 200 |
| Lactose | 400 |
| 10% aqueous gelatine solution | 9 |
| Maize starch | 35 |
| Magnesium stearate | 6 |

(ii)

| | |
|---|---|
| [2-hydroxy-2-(2'-naphthyl)-ethyl] - isopropylamine hydrochloride | 100 |
| Lactose | 100 |
| Maize starch | 25 |
| Gelatine | 5 |
| Stearic acid | 2.5 |

| | |
|---|---|
| [2-hydroxy-2-(2'-naphthyl)-ethyl] - isopropylamine hydrochloride | 50 |
| Lactose | 150 |
| Maize starch | 25 |
| Talc | 5 |

The [2-hydroxy-2-(2'-naphthyl)-ethyl] - isoproplamine hydrochloride is mixed with an inert diluent (lactose) and is granulated with a binding agent (starch paste, gelatine solution or acacia mucilage). A disintegrating agent (maize starch or alginic acid) is mixed with the granules and there is then added thereto a lubricating agent (magnesium stearate, stearic acid or talc). The mixture is compressed into tablets according to the known art and there are obtained tablets containing for example 50, 100 or 200 mg. of active ingredient and which are suitable for oral administration for therapeutic purposes.

What I claim is:

1. A naphthalene derivative selected from the group consisting of compounds of the formula:

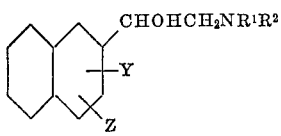

wherein $R^1$ is selected from the group consisting of hydrogen and methyl, $R^2$ is a branched-chain alkyl radical of 4 carbon atoms, and Y and Z are selected from the group consisting of hydrogen, bromine, chlorine, lower alkyl and lower alkoxy radicals, and the salts thereof with pharmaceutically-acceptable acids.

2. The compound [2hydroxy-2-(2'-naphthyl)-ethyl]-isopropylamine.

3. The salts of the compound of claim 2 with pharmaceutically-acceptable acids.

4. The compound [2-hydroxy-2-(2'-naphthyl)-ethyl]-tert.-butylamine.

5. The salts of the compound of claim 4 with pharmaceutically-acceptable acids.

6. The compound [2-hydroxy-2-(2'-naphthyl)-ethyl]-sec.-butylamine.

7. The salts of the compound of claim 6 with pharmaceutically-acceptable acids.

8. The compound [2-hydroxy-2-(2'-naphthyl)-ethyl]-isobutylamine.

9. The salts of the compound of claim 8 with pharmaceutically-acceptable acids.

References Cited by the Examiner
UNITED STATES PATENTS

| | | | |
|---|---|---|---|
| 2,606,208 | 8/52 | Burtner | 260—570.6 |
| 2,629,738 | 2/53 | Fernald | 260—570.6 |
| 2,816,059 | 12/57 | Mills | 260—570.6 |
| 2,900,415 | 8/59 | Biel | 260—570.6 |
| 2,938,921 | 5/60 | Mills | 260—570.6 |

OTHER REFERENCES

Moed et al.: "Recueil des travaux chimiques des Pays-bas," vol. 71, pp. 933–44 (1952).

Radt: "Elsevier's Encyclopedia of Organic Chemistry," vol. 12B, Series III, pages 1118–21 (1950).

Rajagolan et al.: "Chemical Abstracts," vol. 39, page 3594 (1945).

CHARLES B. PARKER, *Primary Examiner.*

LEON ZITVER, *Examiner.*